Patented Sept. 1, 1936

2,052,736

UNITED STATES PATENT OFFICE 2,052,736

PROCESS FOR PREPARING DIHYDRO-TERPINEOL AND MENTHONE

Adolph Zimmerli, New Brunswick, N. J., assignor to Newport Industries, Inc., Pensacola, Fla., a corporation of Delaware No Drawing. Application July 14, 1934,
Serial No. 735,206

3 Claims. (Cl. 260—132)

This invention relates to a process for producing dihydroterpineol and menthone.

It is an object of the invention to provide a process for the preparation of dihydroterpineol by catalytic hydrogenation of terpineol by means of nascent hydrogen furnished by the simultaneous dehydrogenation of a cyclic secondary alcohol.

Another object is to provide means whereby the hydrogenation of terpineol can be carried out without the introduction of extraneous hydrogen.

Another object of the invention is to enable the process to be carried out in the liquid phase without pressure.

A further object is to provide means whereby the hydrogen yielding cyclic alcohols are transformed into ketones, a class usually more valuable than the corresponding alcohols, thereby greatly increasing the economical value of the reaction.

Other objects of the invention will manifest themselves from a reading of the following specification.

As under certain conditions a catalyst can promote hydrogenation as well as dehydrogenation, an equilibrium is usually formed with more or less of the hydrogenated or dehydrogenated compound present, depending on such conditions as temperature, pressure, concentration, etc.

If two or more groups of compounds which can exist in different stages of hydrogenation are treated with a hydrogenating catalyst, an equilibrium will be reached which may or may not involve transition of hydrogen from one group to the other.

I have found that if terpineol is heated with a menthol in the presence of a hydrogenated catalyst, such an exchange of hydrogen takes place whereby dihydroterpineol is formed on the one hand and a cyclic ketone on the other. The reaction proceeds practically quantitatively under suitable conditions and no pressure is necessary. This surprising result could not be foreseen as ordinarily similar reactions have to be carried out under considerable pressure.

A great number of hydrogenating catalysts are known. Good results, however, have been obtained with nickel, copper and combinations of the two among themselves or with other metals, like zink, manganese, or chromium, with or without a support.

The amount of catalyst may vary in wide limits. The end result is the same, only the time is changed. Usually from 1% to 5% is sufficient to terminate the reaction within twenty-four hours.

The following examples will illustrate the preferred methods for individual cases:

Example 1

One mol of crystallized alphaterpineol and two mols of synthetic d,1-menthol are heated to boiling in a vessel provided with reflux condenser, together with 4% of a hydrogenating catalyst for twenty-four hours. At the end of this period the menthone is separated by means of hydroxylamine hydrochloride in known manner, and the residual oil is fractionally distilled. A small percentage of hydrocarbons is collected first, then substantially pure dihydroterpineol between 205 and 209 degrees centigrade, and finally some unchanged menthol.

Example 2

One mol of alphaterpineol and two mols of the liquid mixture of menthols obtained in the purification of synthetic menthol are heated with 4% of a hydrogenating catalyst as in Example 1.

After twenty-four hours the reaction mixture is cooled down to 100 degrees centigrade, an equal weight of powdered sodiumbisulphate is added and the mixture refluxed for twenty hours. The sodiumbisulphate is then dissolved out with water; the oily layer is separated and fractionated. The dihydroterpineol, by this treatment, has been dehydrated and isomerized into Δ-3 menthene, boiling at 167 to 170 degrees centigrade.

It is removed by fractional distillation. The residue consists principally of menthone, which on reduction yields a mixture of d,1-menthol and liquid menthols. The latter can be separated in known manner and used for a new batch with fresh terpineol.

By the term "a menthol" I mean any of the isomeric compounds, either individually or as a group, having the formula of a 3-para-menthanol.

While I have given examples for carrying out the invention in a selected individual case, modifications will suggest themselves to those skilled in the art, and I do not wish to be limited except as expressed in the appended claims.

What is claimed is:

1. The process of simultaneously preparing dihydroterpineol and menthone, comprising boiling about 1 mol of terpineol with 2 mols of menthol with a hydrogenating catalyst.

2. The process of simultaneously preparing dihydroterpineol and menthone, comprising heating about 1 mol of terpineol with 2 mols of menthol with a hydrogenating catalyst to a boiling temperature at atmospheric pressure.

3. The process of simultaneously preparing dihydroterpineol and menthone which comprises boiling terpineol and a menthol together under reflux conditions in the presence of a hydrogenation catalyst, the terpineol and menthol being in the proportion of 1 mol of terpineol to 2 mols of menthol.

ADOLPH ZIMMERLI.